United States Patent

[11] 3,603,775

[72] Inventors Richard T. Galloway;
David H. Brunk, both of Panama City, Fla.
[21] Appl. No. 754,268
[22] Filed Aug. 21, 1968
[45] Patented Sept. 7, 1971
[73] Assignee The United States of America as represented by the Secretary of the Navy

[54] STEERING COMPUTER AND INDICATOR
9 Claims, 5 Drawing Figs.
[52] U.S. Cl. ...................................................... 235/150.26
[51] Int. Cl. ....................................................... G06g 7/66
[50] Field of Search ............................................ 235/150.26, 61.5; 343/6; 244/3.20

[56] References Cited
UNITED STATES PATENTS
3,342,982  9/1967  Manoni ........................ 244/3.20
Primary Examiner—Malcolm F. Hubler
Attorneys—Louis A. Miller, Don D. Doty and William T. Skeer ABSTRACT: A steering control system for automatically navigating a vehicle along a predetermined course having a reference station for supplying distance and timing data signals, signal generators for supplying vehicle data signals, a receiver, and a computer for computing the steering mechanism actuations necessary to make said vehicle maintain the aforesaid predetermined course in response to said data signals.

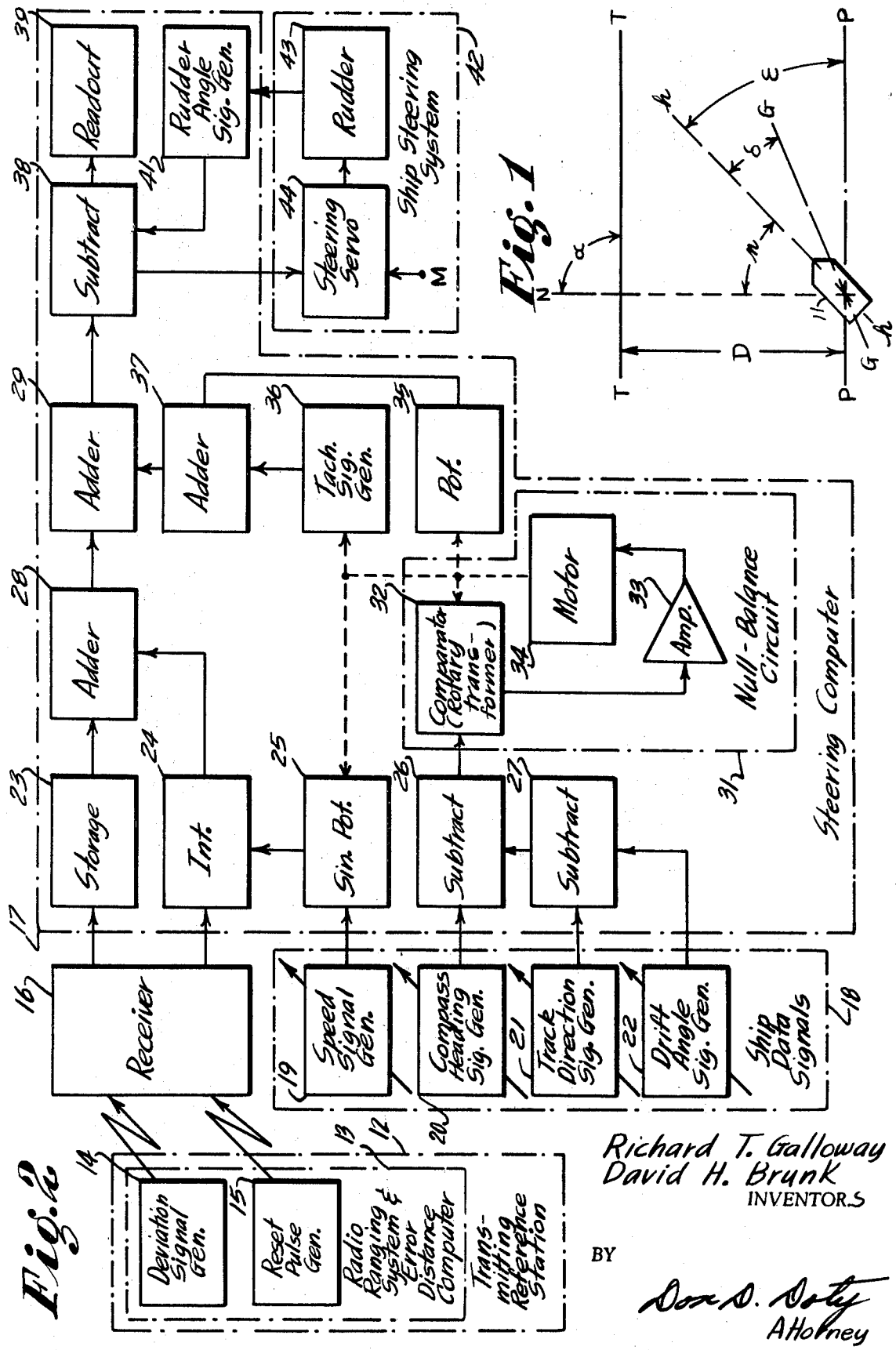

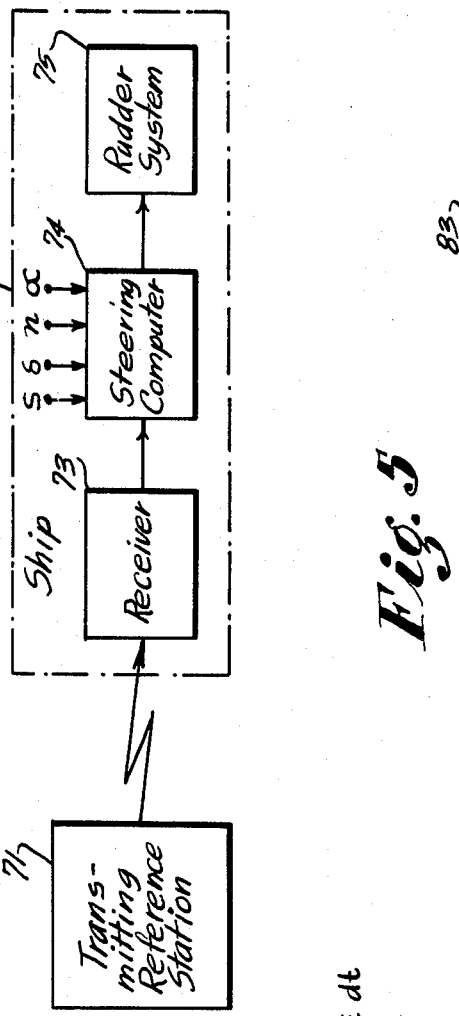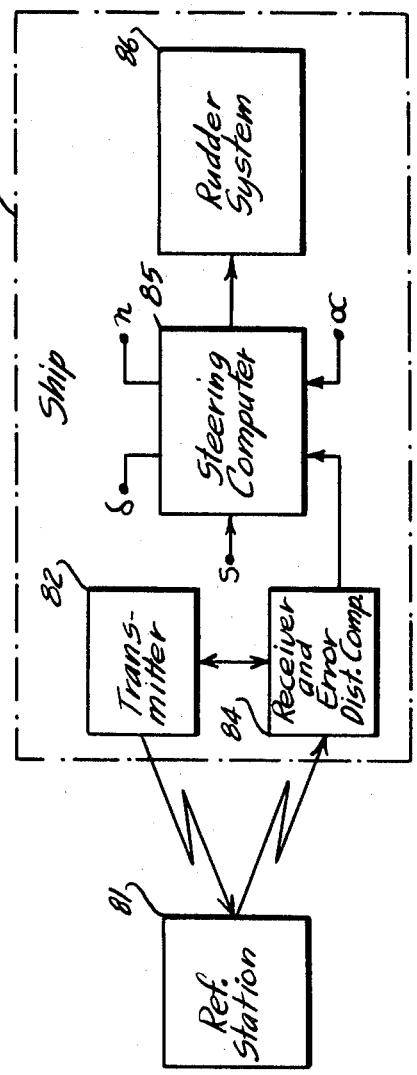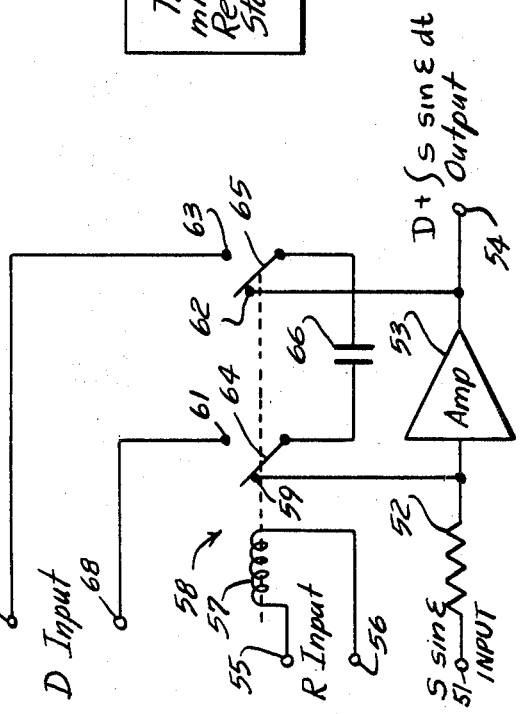

STEERING COMPUTER AND INDICATOR

The invention described herein may be manufactured and used by or for the Government of the United States of America for governmental purposes without the payment of any royalties thereon or therefor.

The present invention relates generally to navigation systems and, in particular, is a computer for automatically steering a boat or other vehicle along a predetermined course.

Heretofore, numerous prior art computer systems have been employed for purposes similar to those of the subject invention. Although satisfactory in many instances, they have sometimes been found to be deficient, in that they require a pilot to make judgments with respect to the heading that it is necessary to take in order to correct the deviation from a desired course. Then, steering action must be effected to bring the ship or vehicle back on course. To accomplish this in an optimum manner requires well trained, highly experienced pilots, and even then there is ordinarily some time lag between actual course deviation and the taking of corrective action. Moreover, to the extent that the pilot's judgment is defective for any reason whatsoever, to that extent navigation errors occur.

Present commercial automatic pilots will automatically steer a ship or other vehicle along a preset heading in response to automatic direction information from a compass or the like; however, insofar as is known, none thereof is capable of automatically steering a predetermined track. Accordingly, they, too, leave something to be desired.

The instant invention overcomes many of the inadequacies and disadvantages of the prior art, inasmuch as it enables a ship or other vehicle to be automatically guided along a desired course or track in an expeditious and accurate manner.

It is, therefore, an object of this invention to provide an improved vehicle navigation system.

Another object of this invention is to provide an improved steering control computer.

Still another object of this invention is to provide an improved method and means for automatically navigating a ship or other vehicle along a predetermined course.

A further object of this invention is to provide an improved computer for returning a predetermined mobile system to a preset control parameter after it has deviated therefrom.

A further object of this invention is to provide an improved computer system which facilitates the acquiring of a preset parameter by a given mobile device.

Another object of this invention is to provide an improved, simplified vehicle steering computer system that is easily and economically manufactured, maintained, and operated.

Other objects and many of the attendant advantages will be readily appreciated as the subject invention becomes better understood by reference to the following detailed description, when considered in conjunction with the accompanying drawings wherein:

FIG. 1 is an exaggerated representation of the geometry solved by the subject invention during the normal automatic navigation of a ship along a predetermined course;

FIG. 2 is a block diagram of a system incorporating the subject invention;

FIG. 3 is an exemplary integration and adder combination that may be included in the system of FIG. 2;

FIG. 4 depicts a typical operational system which includes the subject invention; and FIG. 5 illustrates still another typical functional system that may include the instant invention.

In order to understand the navigation problem to be solved and the manner in which it is solved by the subject invention, the geometry thereof is schematically depicted in FIG. 1.

In this particular case, the preferred embodiment of the invention will be considered as being a ship navigation system, in order to keep the disclosure thereof as simple and succinct as possible; however, it should be understood that other vehicles in other environments natural thereto are intended to be automatically navigated thereby, inasmuch as making the transition from one to the other merely involves the making of design choices. Of course, the making of such design choices would be well within the purview of one skilled in the art having the benefit of the teachings presented herewith.

Accordingly, in FIG. 1, there is shown a ship 11 that has deviated for some reason or another from a course or track T—T, which is desired to be traversed. In this particular case, ship 11 is presently located a distance D from track T—T and, thus, distance D is considered to be the navigation error distance. Track T—T, of course, has a known compass direction relative to compass N, which is indicated by angle $\alpha$. It is equal to the angle between compass north N and an imaginary long dashed line P—P drawn parallel to track T—T through ship 11.

The heading of ship 11 is illustrated by dashed line $h$—$h$, and the ground course actually traveled thereby is indicated by dashed line G—G. As a result of lines P—P, $h$—$h$, and G—G, the heading, heading error, and the drift of ship 11 can be represented by angles $\eta$, $\epsilon$, and $\delta$, respectively.

Referring now to FIG. 2, a preferred embodiment of the subject invention is shown as having a transmitting reference station 12 adapted for broadcasting a pair of data signals from a known position, one of which represents distance D (see FIG. 1), the distance that ship 11 has strayed from its desired course T—T.

In order to determine distance D, a radio ranging system and error distance computer 13 is employed. It may be conventionally designed and constructed to echo range upon ship 11 to determine the distance and bearing thereto and then, having the known distance from reference station 12 to track T—T programmed therein, compute the error distance between track T—T and ship 11.

Incorporated in radio ranging system and error distance computer 13 is a deviation signal generator 14 which generates a signal representing distance D and effectively broadcasts it within the ambient environmental medium. Also, a reset pulse generator 15 is included in radio ranging system and error distance computer 13, and its reset pulse R is, likewise, timely broadcast throughout the ambient environmental medium.

In order to actually utilize the aforesaid D and R signals, a suitable receiver 16 is located aboard ship 11, along with the remaining elements of FIG. 2, to be discussed below in conjunction therewith. It receives the signals broadcast at transmitting reference station 12 and then supplies them to the appropriate inputs of a steering computer 17.

Because the vehicle under discussion at present is considered to be a ship, and because the transmitting reference station is ordinarily located at some place remote thereto, transmitter 12 and receiver 16 are preferably of the radio type; however, it should be understood that any appropriate telemetering system may be substituted therefor which would cause the subject invention to properly function within whatever environmental medium or under whatever conditions or circumstances that may be in existence at the time.

Also located on board ship 11 is a means 18 for supplying various data or information signals pertinent to the condition thereof at any given instant. Such data signals are supplied to steering computer 17 on a continuous basis in order to effect automatic piloting of the ship. They are provided by an adjustable speed signal generator 19, which produces an analog output signal S representing the speed of ship 11 at any given instant; a variable compass heading signal generator 20, which produces an analog output signal $\eta$ representing the compass heading of ship 11 at any given instant; an adjustable track direction signal generator 21, which produces an analog output signal $\alpha$ representing the known compass direction of track T—T; and an adjustable drift angle signal generator 22 for producing an analog output signal $\delta$ representing the drift of ship 11—that is, the difference between the ship's heading and its ground course—at any given instant. Although the compass of the aforementioned compass heading signal generator 20 may be any appropriate or convenient conventional type, it has been found that a properly designed gyrocompass is eminently suitable for such purpose.

In order to facilitate disclosure of this invention in as simple a manner as possible, all of the foregoing ship data signal generators are indicated as being manually adjustable. For most practical purposes, of course, manual adjustment thereof is quite satisfactory. On the other hand, it should be understood that in the event it is desired for such functions to be controlled automatically, they may be connected to and associated with any compatible control apparatus. Obviously, so doing would be well within the purview of the artisan having the benefit of the teachings presented herewith, and, hence, no further discussion with respect thereto will be presented at this time.

As previously suggested, in order to function properly, all of the aforesaid input data signals must be respectively supplied to various elements of steering computer 17. Hence, the D signal output of receiver 16 is connected to the input of a memory or storage device 23, and the R signal output is connected to one of the inputs of an integrator 24. Speed signal generator 19 has its output connected to one of the inputs of a sine potentiometer 25, and compass heading signal generator has its output connected to one of the inputs of a subtract circuit 26. Track direction signal generator 21 has its output connected to one of the inputs of another subtract circuit 27, and drift angle signal generator 22 has its output connected to the other input of said subtract circuit 27. The outputs of sine potentiometer 25 and subtract circuit 27 are connected to the other of the inputs of integrator 24 and subtract circuit 26, respectively.

The outputs of storage 23 and integrator 24 are connected to the inputs of an adder circuit 28, the output of which is connected to one of the inputs of another adder circuit 29.

A schematic of an exemplary integrator-adder combination that may be used as integrator 24, and adder 28 of FIG. 2 will be discussed in some detail subsequently in conjunction with FIG. 3.

The output of the aforesaid subtract circuit 26 is supplied to a null-balance circuit 31 and is actually connected to the input of a comparator 32. Comparator 32 is preferably of the rotary transformer type, one winding of which is adjustable by a rotatable shaft input. Thus, in effect, comparator 32 produces an electrical output signal that is the algebraic difference between an electrical input signal and a mechanical input signal, as is conventional in the null-balance circuit art. The output of comparator 32 is connected through an amplifier 33 to a reversible motor 34, the shaft output of which is connected to the shaft input of said comparator 32.

The output of null-balance circuit 31 is the shaft output of motor 34. It is connected to the rotatable adjusting input of a potentiometer 35 and to the rotatable adjusting input of the aforesaid sine potentiometer 25, as well as to the shaft input of a tachometer signal generator 36.

Tachometer signal generator 36 may be of any conventional type which produces an electrical output signal that is the first derivative of the revolutions of the input per increment of time, and in this particular instance, has an output equal to $d\epsilon/dt$, where $\epsilon$ is the shaft input signal.

The outputs of both potentiometer 35 and tachometer signal generator 36 are respectively connected to a pair of inputs of an adder circuit 37, the output of which is coupled to the other input of the aforementioned adder circuit 29. The output of adder circuit 29 is connected to one of the inputs of a subtract circuit 38, one of the outputs of which is connected to the input of an appropriate readout 39.

Readout 39 may, for example, be a meter type indicator, a recorder, oscilloscope, oscillograph, or any other type that would facilitate the monitoring of the automatic navigation of ship 11 by a human pilot. It continuously indicates the difference between the actual rudder angle and the rudder angle required to guide the ship back to its desired track or course, in the event the pilot, for some reason or another, decides to override the ships automatic steering system for such purpose.

A rudder signal generator 41—which produces an output signal proportional to the ship's rudder position—has its output connected to the other input of subtract circuit 39, and in order to produce such signal, it is physically connected to ship steering system 42 and to the output of rudder 43 in particular. A steering servo 44 of ship steering system 42 has the input thereof connected to the other input of subtract circuit 38 and the output thereof mechanically connected to rudder 43 for movement thereof.

As previously mentioned, FIG. 3 depicts an exemplary integrator 24—adder 28 combination which may be incorporated in the system of FIG. 2. As a circuit combination, it contains a trio of inputs, to which are respectively applied signals S sin $\epsilon$ (the output of sine potentiometer 25), R (the reset pulse output of receiver 16), and D (the deviation output signal from receiver 16). It, therefore, includes an input terminal 51, to which is applied said S sin $\epsilon$ signal. It is connected through a resistor 52 to the input of an amplifier 53. The output of amplifier 53 is, likewise, connected to an output terminal 54, which acts as the output of adder 28. As will be discussed more fully below, the signal produced at terminal 54 is mathematically defined as $D + \int S \sin \epsilon\, dt$.

The input for signal R, the reset pulse from receiver 16, is input terminals 55 and 56, to which inductance coil 57 of a relay 58 is connected. Relay 58 contains a first pair of electrical contacts 59 and 61 and a second pair of electrical contacts 62 and 63 which are adapted for selectively being contacted by movable arms 64 and 65, respectively. In this particular case, movable arms 64 and 65 are ganged together and are actuated by coil 57 to simultaneously contact either contacts 59 and 62 or contacts 61 and 63, depending whether or not coil 57 is energized by a reset pulse.

Contacts 59 and 62 are respectively connected to the input and output of amplifier 53, and movable arms 64 and 65 are connected across a capacitor 66. Contacts 61 and 63 are respectively connected to a pair of input terminals 67 and 68, to which is applied the aforementioned deviation signal D from storage 23.

FIG. 4 illustrates a simplified version of the system of FIG. 2. It is disclosed primarily for the purpose of making it easy to distinguish it from the embodiment of the invention portrayed generally in FIG. 5.

In the embodiment of FIG. 4, there is shown a transmitting reference station 71 which, like transmitting station 12 of FIG. 1, determines distance D and broadcasts a signal representative thereof along with a timely broadcast reset pulse R to a ship 72 remotely disposed therefrom. Signals D and R are received by a receiver 73 and converted to signals compatible with the inputs of a steering computer 74. Steering computer 74 is, of course, connected to the output of receiver 73, and a rudder system 75 is connected to the output of steering computer 74. Obviously, in this embodiment of the invention, receiver 73, steering computer 74, and rudder system 75 are located on ship 72, and, of course, those elements for providing input signals S, $\delta$, $\eta$, and $\alpha$ (not shown) are located thereon, too.

FIG. 5 discloses another possible system arrangement, wherein all of the components of the subject invention are located on board ship, with the exception of a predetermined reference station located at any suitable place that is known relative to the course desired to be traveled. Thus, there is disclosed a reference station 81 which is adapted for reflecting signals broadcast by a transmitter 82 located on ship 83. While reference station 81 may be only a signal reflector and still perform its function, it should be understood that other types such as, for instance, a transponder may be used, if so desired or if operational circumstances so warrant. A receiver and error distance computer 84 receives the echo signal from reference station and computes distance D therefrom. Of course, transmitter 82 and receiver and error distance computer 84 are interconnected as necessary to provide synchronism therebetween and to timely supply a reset pulse to the receiver portion of said receiver and error distance computer 84. Hence, in this particular case, the output signals of receiver and error distance computer 84 are D and R. A steering computer 85 is connected to the output of receiver and error distance computer 84, and a rudder system 86 is connected to the output of steering computer 85.

Although not shown in FIG. 5, steering computer 85 is supplied ship data signals S, $\delta$, $\eta$, and $\alpha$ by appropriate generating means located on board ship 83.

At this time, it would perhaps be noteworthy that all of the elements disclosed in block form in FIGS. 2, 4, and 5 are well known and conventional per se. Accordingly, it is to be understood that it is their unique interconnections and interactions that produce the subject invention and the new and improved automatic vehicle navigation results effected thereby.

The operation of the invention will now be discussed briefly in conjunction with all of the figures of the drawing.

Due to crosscurrents of water or air, or due to pilot error or over-control, a ship traveling a desired course ordinarily deviates therefrom from time to time. While such deviation may not be critical out in the deep ocean, in the event the desired course happens to be located in a narrow channel, or if it happens to be located in an area containing various and sundry navigation hazards, it could become dangerous and, perhaps, if too extensive, could become fatal. Hence, an accurate automatic pilot system such as this invention is exceedingly valuable under such circumstances, since it will cause the ship to be guided in such manner as seek and hunt closely along the desired track.

A typical instantaneous guidance situation of such a ship 11 is depicted in FIG. 1. It is shown therein in an exaggerated deviated position; and in order to get it back on track T—T as quickly as possible, an optimum rudder angle must be continuously maintained during its approach thereto. Such angle is maintained by constantly calculating the rudder angle error and correcting it as the ship travels toward track T—T. The apparatus for so doing may be defined automatically by the expression:

$$C = D + \int S \sin(\eta - \alpha + \delta) dt + (\eta - \alpha + \delta + d\epsilon/dt) - \theta, \quad (1)$$

where
$C$ = steering correction signal,
$\epsilon$ = heading error angle 32 $\eta - \alpha + \delta$,
$D$ = the error distance between the ship and the desired track,
$S$ = ship's speed in knots,
$\eta$ = ship's compass heading,
$\alpha$ = track direction,
$\delta$ = drift angle,
$t$ = time,
$d\epsilon/dt$ = change in heading error angle per change in time,
$\Phi$ = required rudder angle,
$\theta$ = actual rudder angle.

As ship 11 travels along, receiver 16 receives signals D and R from deviation signal generator 14 and reset pulse generator 15 of radio ranging system and error distance computer 13 located at known reference transmitting station 12. Furthermore, the ship data signal generators 19 through 22 are constantly supplying signals S, $\eta$, $\alpha$, and $\delta$, respectively, for use by steering computer 17. As a result of signals $\alpha$ and $\delta$ being algebraically subtracted by subtract circuit 27, an output signal $\alpha - \delta$ is produced which is supplied to subtract circuit 26; and as a result of signals $\eta$ and $(\alpha - \delta)$ being algebraically subtracted by subtract circuit 26, an $\eta - (\alpha - \delta)$ or a heading error signal $\epsilon$ is produced at the output thereof.

Heading error signal $\epsilon$ is supplied to the electrical input of comparator 32 which, in turn, causes null-balance circuit 31 by means of amplifier 33 and reversible motor 34 to effect balance of the shaft input thereto, in the event an unbalance initially exists. Hence, the shaft of motor 34 is capable of also supplying a mechanical signal representing the corrected signal $\epsilon$ to the shaft inputs of sine potentiometer 25, potentiometer 35, and tachometer signal generator 36 for appropriate adjustment thereof.

As a result of signals S and $\epsilon$ being supplied to sine potentiometer 25, a signal representing S sin $\epsilon$ is produced thereby that is supplied to integrator 24. Integrator 24, in turn, performs the integration function thereof and, thus, produces an output signal defined by the expression $\int S \sin \epsilon \, dt$.

Adder 28 receives the stored signal D from storage 23 and adds it to signal $\int S \sin \epsilon \, dt$ to effect an output signal represented by the expression $D + \int S \sin \epsilon \, dt$, which is then supplied to one of the inputs of adder 29.

The aforementioned corrected shaft signal $\epsilon$ of motor 34 adjusts potentiometer 35 in such manner that the electrical equivalent is produced at the output thereof, and this is the signal supplied to one of the inputs of adder 37. The other input thereto is supplied by tachometer signal generator 36, which produces a direct current voltage signal representative of the first derivative of signal $\epsilon$ with respect to time $t$, viz, $d\epsilon/dt$.

Addition of $\epsilon$ to $d\epsilon/dt$ by adder 37 produces an output signal equal to $\epsilon + d\epsilon/dt$ and this signal is, in turn, supplied to the aforementioned algebraic adder 29 where it is added to $D + \int S \sin \epsilon \, dt$ to become $\Phi = D + \int S \sin \epsilon \, dt + (\epsilon + d\epsilon/dt)$ at the output thereof. This, of course, is the rudder angle required to guide ship 11 back toward track T—T in an optimized manner after it has deviated therefrom.

Because the actual rudder angle $\theta$ may be different than said required rudder angle $\Phi$ as a result of ship 11 deviating from its desired track, this difference is effectively measured by subtract circuit 38. Thus, rudder angle signal generator 41—which is mechanically connected to ship's rudder 43—supplies said signal $\theta$ representing the ship's actual rudder angle at any given instant to algebraic subtract circuit 38 where signal $\Phi$ is compared therewith. If a difference exits, a plus or minus correction signal C is supplied to steering servo which, in turn, drives rudder 43 in such manner as to turn ship 11 back toward its desired track T—T at the optimum approach angle.

As may readily be seen from the foregoing, the method and means constituting this invention may be employed to initially seek, approach, and acquire a predetermined course or track, or it may be used to automatically hunt therealong.

As previously suggested, in the event automatic steering of the ship is not desired during any given operational circumstances, a human pilot may either disconnect or override the automatic aspect of the invention. For this purpose a manual control input M is shown as being connected to steering servo 44. Being conventional, the structure of said manual control is not disclosed, but it should be understood that it exists within steering servo 44 and is optionally available for use thereat.

Readout 39, connected to the output of subtract circuit 38, facilitates monitoring the automatic guidance of the ship along its intended track, and, of course, during manual operation, it provides information which may be used to an advantage by the pilot, thereby enabling him to more easily and efficiently steer the ship back on course.

As previously mentioned, FIG. 3 is a combination integrator 24—adder 28 circuit that may be included in the system of FIG. 1. Input terminal 51 thereof receives signal S sin $\epsilon$ from the output of sine potentiometer 25, inputs 55 and 56 thereof receive signal R from receiver 16, and inputs 67 and 68 thereof receive signal D from receiver 16. In the deenergized condition, relay 58 normally has its movable arms in contact with contacts 59 and 62, respectively, during which time capacitance 66 is connected across amplifier 53. This, in turn, combines storage capacitance 66, resistance 52, and amplifier 53 in such manner as to form an integrator circuit for the integration of input signal S sin $\epsilon$. But because some D signal voltage was previously stored on capacitance 66 when relay 58 was in the energized condition, in the deenergized condition, the charge thereon is added to the integrated S sin $\epsilon$ to produce an output signal representing $D + \int S \sin \epsilon \, dt$.

The aforementioned reset pulse is generated between updating transmissions of data signal D; therefore, when actuator coil 57 is energized thereby, movable arms 64 and 65 are moved into contact with contacts 61 and 63, respectively. So doing, of course, connects input terminals 67 and 68 across capacitance 66 and, thus, allows the charge thereon to be updated to that of the latest D signal transmission. Then, when relay 58 is again deenergized, said latest D signal is added to signal $\int S \sin \epsilon \, dt$ to become an updated output of $D + \int S \sin \epsilon \, dt$.

The system of FIG. 4 operates in substantially the same manner as the system of FIG. 2; therefore, to simplify this disclosure, no further discussion will be presented at this time.

The system of FIG. 5 operates in essentially the same manner as the systems of FIGS. 2 and 4, with the exception that data signals D and R are obtained differently. In this instance transmitter 82 and receiver and error distance computer 84 echo-range on reference station 81 and computer distance D on board ship 83. Also, reset pulse R is generated on board ship 83, preferably by transmitter 82. Thus, along with ship data signals S, δ, η, and α (generated by their respective generators aboard ship 83), signals D and R are supplied to steering computer 85. Of course, as in the aforementioned system species, steering computer 85 controls rudder 86 to guide ship 83 back to its intended track.

From the foregoing, it may readily be seen that the subject invention constitutes a new and improved navigation system which is exceedingly useful in guiding a mobile vehicle toward and along a desired course.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A navigation system for guiding a vehicle having a steering means toward and along a predetermined course comprising in combination:
    means for determining the distance said vehicle has deviated from said predetermined course and generating a data signal representative thereof;
    means for generating a plurality of data signals respectively representing vehicle speed, vehicle compass heading, vehicle drift angle, and predetermined course direction;
    means connected to said vehicle steering means for generating a data signal representing the disposition thereof;
    means effectively connected to the output of said vehicle course deviation data signal generating means for receiving and storing the deviation data signal generated thereby;
    an integrator having a pair of inputs and an output, with one of the inputs thereof effectively connected to a reset pulse;
    a sine potentiometer having a pair of inputs and an output, with one of the inputs thereof connected to the output of said means for generating a plurality of data signals for response to the vehicle speed data signal produced thereby, with the other input thereof being a control shaft input, and with the output thereof connected to the other input of said integrator;
    a first subtract circuit having a pair of inputs and an output, with one of the inputs thereof connected to the output of said means for generating a plurality of data signals for response to the course direction data signals produced thereby, and with the other input thereof connected to the output of said means for generating a plurality of data signals for response to the vehicle drift angle data signal produced thereby;
    a second subtract circuit having a pair of inputs and an output, with one of the inputs thereof connected to the output of said means for generating a plurality of data signals for response to the vehicle compass heading signal produced thereby, and with the other input thereof connected to the output of said first subtract circuit;
    a comparator having a pair of inputs and an output, with one of the inputs thereof connected to the output of said second subtract circuit, and with the other input thereof being a control shaft input;
    a reversible motor having an input and a shaft output, with the input thereof effectively connected to the output of said comparator, with the shaft output thereof coupled to the control shaft input of said comparator for the null-balance thereof, and with the shaft output thereof coupled to the control shaft input of the aforesaid sine potentiometer;
    means connected to the shaft output of said reversible motor for generating an output signal representing the first derivative thereof with respect to time;
    a potentiometer having adjustable shaft input coupled to the shaft output of said reversible motor;
    a first adder circuit having a pair of inputs and an output, with the inputs thereof respectively connected to the outputs of said first derivative signal generating means and said potentiometer;
    a second adder circuit having a pair of inputs and an output, with one of the inputs thereof connected to the output of said storage means, and with the other input thereof connected to the output of said integrator;
    a third adder circuit having a pair of inputs and an output, with one of the inputs thereof connected to the output of said first adder circuit, and with the other input thereof connected to the output of said second adder circuit; and
    a third subtract circuit having a pair of inputs and an output, with one of the inputs thereof connected to the output of said third adder circuit, and with the other input thereof connected to the output of said vehicle steering means disposition data signal generating means for response to the vehicle steering means disposition data signal produced thereby.

2. The invention of claim 1 further characterized by means effectively connected between an output of said vehicle distance deviation determining means and an input of said steering disposition changing means for timely updating the vehicle deviation distance data signal supplied thereto.

3. The device of claim 1 wherein said means for determining the distance said vehicle has deviated from said predetermined course and generating a data signal representative thereof comprises:
    means for determining the distances from a known reference station to said vehicle and from said reference station and the predetermined course to be traveled by said vehicle;
    means connected to said distance determining means for computing the distance said vehicle is located from said predetermined course in response to the aforesaid determined distances; and
    a signal generator means connected to said computing means for generating an output signal corresponding to the distance said vehicle is located from said predetermined course at any given instant.

4. The device of claim 1 wherein said means for generating a plurality of data signals respectively representing vehicle speed, vehicle compass heading, vehicle drift angle, and predetermined course direction comprises a like plurality of signal generators located on board said vehicle.

5. The device of claim 1 wherein said means connected to said vehicle steering means for generating a data signal representing the disposition thereof comprises a signal generator.

6. The invention of claim 1 further characterized by a readout connected to the output of said third subtract circuit.

7. The invention of claim 1 further characterized by:
    a steering servo connected to the output of said third subtract circuit; and
    a vehicle control means connected between the output of said steering servo and the input of the aforesaid vehicle steering means disposition data signal generating means.

8. A computer for navigating a vehicle having a steering means toward and along a predetermined course in response to a plurality of input data signals representing the error distance between said vehicle and said predetermined course at any given instant, vehicle speed, vehicle compass heading, vehicle drift angle, the compass direction of said predetermined course, and the disposition of the aforesaid vehicle steering means, and a reset pulse, respectively, comprising in combination:

a first subtract circuit having a pair of inputs and an output, with one of the inputs thereof adapted for response to the data signal representing the compass direction of said predetermined course, and with the other input thereof adapted for response to the data signal representing said vehicle drift angle;

a second subtract circuit having a pair of inputs and an output, with one of the inputs thereof adapted for response to the data signal representing the vehicle compass heading, and with the other input thereof connected to the output of said first subtract circuit;

an adjustable sine potentiometer having a pair of inputs and an output, with one of the inputs thereof adapted for response to the data signal representing vehicle speed, and with the other input thereof being a control shaft input;

null-balance means connected to the output of said second subtract circuit for producing the mechanical equivalent thereof in the form of a shaft position proportional thereto, with the shaft output thereof connected to the control shaft input of the aforesaid sine potentiometer;

another potentiometer having an adjustable shaft input connected to the shaft output of said null-balance means;

a tachometer signal generator having a rotatable shaft input connected to the shaft output of said null-balance means for producing a signal at the output thereof representative of the first derivative of the shaft input thereof with respect to time;

a first adder circuit having a pair of inputs and an output, with the inputs thereof respectively connected to the outputs of said tachometer signal generator and said another potentiometer;

a storage means for storing the input data signal representing the error distance between said vehicle and said predetermined course at any given instant;

an integrator having a pair of inputs and an output, with one of the inputs thereof adapted for response to said reset pulse, and with the other input thereof connected to the output of the aforesaid sine potentiometer;

a second adder circuit having a pair of inputs and an output, with one of the inputs thereof connected to the output of said storage means, and with the other input thereof connected to the output of said integrator;

a third adder circuit having a pair of inputs and an output, with the inputs thereof respectively connected to the outputs of said first and second adder circuits; and a third subtract circuit having a pair of inputs and an output, with one of the inputs thereof adapted for response to the data signal representing the disposition of said vehicle steering means, and with the other input thereof connected to the output of the aforesaid third adder circuit.

9. The invention of claim 8 further characterized by a readout connected to the output of said third subtract circuit.